United States Patent [19]
Pilaro

[11] 3,768,725
[45] Oct. 30, 1973

[54] BREATHABLE, STERILIZABLE AND PEELABLE POUCH AND METHOD OF MANUFACTURE THEREOF

[75] Inventor: Joseph F. Pilaro, Princeton Junction, N.J.

[73] Assignee: National Distillers and Chemical Corporation, New York, N.Y.

[22] Filed: Nov. 11, 1971

[21] Appl. No.: 197,683

[52] U.S. Cl. .............................. 229/66, 206/63.2 R
[51] Int. Cl. ........................................... B65d 33/16
[58] Field of Search ................... 229/66; 206/63.2 R

[56] References Cited
UNITED STATES PATENTS

| | | | |
|---|---|---|---|
| 3,685,720 | 8/1972 | Brady | 229/66 X |
| 3,552,638 | 1/1971 | Quackenbush | 229/66 |
| 3,410,395 | 11/1968 | Sellers | 206/63.2 R |
| 3,625,351 | 12/1971 | Eisenberg | 229/66 X |

*Primary Examiner*—George E. Lowrance
*Assistant Examiner*—Stephen P. Garbe
*Attorney*—Allen A. Meyer, Jr.

[57] ABSTRACT

A breathable, sterilizable and peelable pouch produced from laminated plastic layers having diverse characteristics and a method of manufacture thereof. The pouch is constituted by front and rear walls heat sealed along the side and bottom edges thereof; the front wall comprises two spaced portions, one of which is integral with the rear wall, united by a spunbonded polyolefin panel. It is essential that the heat seal between the interior layers of the laminated material be substantially stronger than the bonding strength between the laminated layers.

8 Claims, 9 Drawing Figures

PATENTED OCT 30 1973 3,768,725

INVENTOR
JOSEPH F. PILARO

BY Allen A. Meyer, Jr.
ATTORNEY

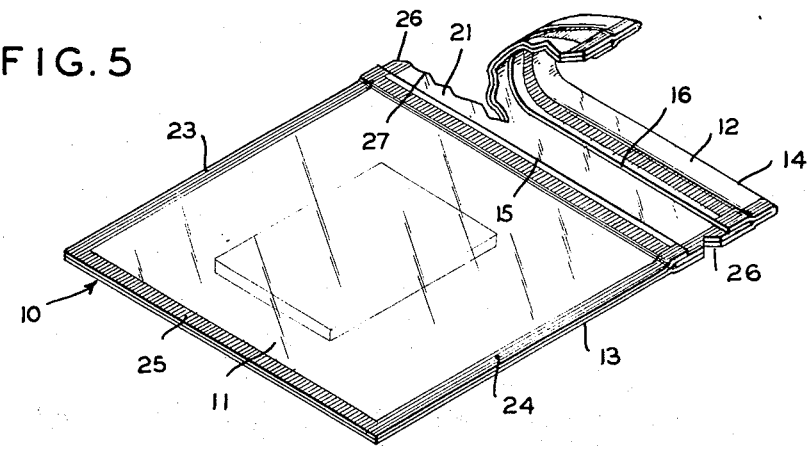
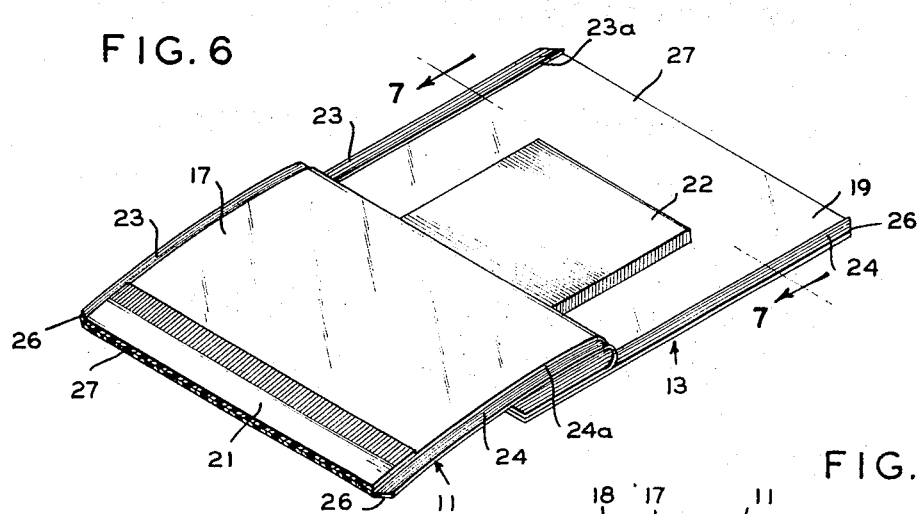
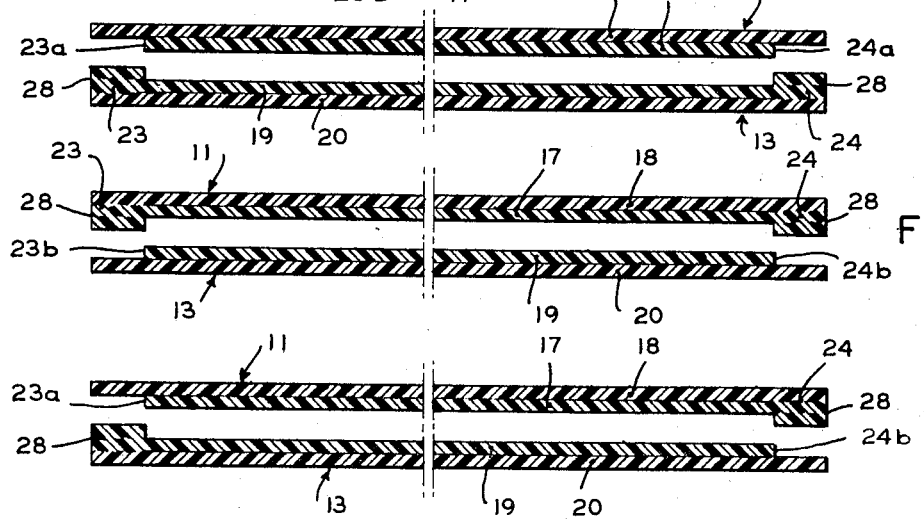

BREATHABLE, STERILIZABLE AND PEELABLE POUCH AND METHOD OF MANUFACTURE THEREOF

This invention relates to a package or pouch for the packaging of sterile articles, such as medical or hospital supplies, and the retention thereof in sterile condition until use.

Comparable bags or pouches are known in this art for the reception and sterile retention of such items as bandages, sutures, surgical instruments, and the like, with the bag and article sterilized by insertion into a suitable sterilizing chamber, evacuating the chamber, and flushing the chamber with a sterilizing gas such as ethylene oxide. An essential requirement in connection with such packages or containers is that the package must be capable of ready opening without the possibility of bringing contaiminated portions of the bag into contact with the contained item when the bag is opened and the contents removed.

It is known to produce pouches of the character with which we here are concerned from laminated layers of plastic materials where the interior layers are constituted by a material which forms an excellent if not rupture-proof seal to itself, while the outer layers are consituted by a material which is relatively weakly sealed to the respective interior layers. It is a bag or pouch of this character with which we presently are concerned.

Accordingly, a major object of the present invention is to provide a novel peel-open sterilized bag which can be sterilized in a sterilizing chamber.

A further object of the invention is to provide a novel peel-open sterilized plastic bag or pouch which will not be subject to bursting during the sterilization process when the sterilizing chamber is evacuated.

A still further object of the invention is to provide a novel peel-open and breathable container which provides a complete plastic sheath surrounding a sterilized product.

It is a still further object of the present invention to provide a novel peel-open and breathable plastic container or pouch which comprises a complete sheath surrounding a sterilized product and which may be opened to permit removal of the contents with particular ease.

These and other objects of the invention will become readily apparent from the following description and accompanying drawings, wherein:

FIG. 5 is a perspective view of the pouch, illustrating the initial step in connection with the opening thereof so as to obtain access to the pouch contents;

FIG. 6 is a perspective view of the pouch, similar to FIG. 5, with the tearing off and discarding of the upper portion of the pouch having been completed and with the front wall of the pouch partially peeled away from the rear wall so as to disclose the bag contents in condition for removal;

FIG. 7 is a transverse sectional view along the plane of the line 7—7 of FIG. 6 illustrating one of the possible ways in which the front and rear walls of te pouch may separate during the peeling operation;

FIG. 8 is a transverse sectional view similar to FIG. 7 and illustrating another manner in which the pouch front and rear walls may separate during the peeling operation; and FIG. 9 is a transverse sectional view similar to FIG. 8 and illustrating a still further manner in which the front and rear walls of the pouch may separate during the peeling operation.

Figure 1:
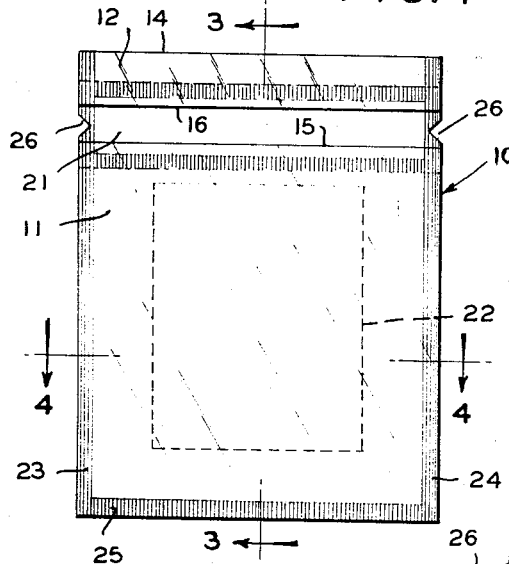
FIG. 1 is a front elevational view of a novel peel-open, breathable pouch, constructed in accordance with the present invention.
Figure 4:
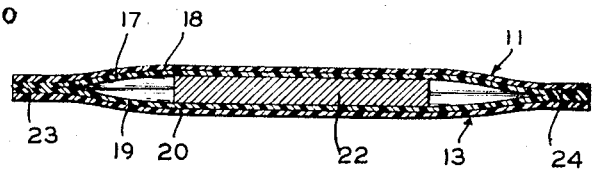
FIG. 4 is a transverse sectional view of the pouch; taken on the line 4—4 of FIG. 1 and looking in the direction of the arrows.

As shown in the drawings, the novel pouch, indicated generally at 10, includes a front wall constituted by spaced bottom and top wall portions 11 and 12, the upper or top portion 12 preferably being formed integrally with the rear wall 13 of the pouch, the rear wall being folded upon itself along the fold line 14 which constitutes the top edge of the finished pouch. It will be noted that the opposed edges 15 and 16 of the bottom and top front wall portions are spaced from each for a purpose to be described more fully hereafter.

The pouch front and rear walls are produced from a plastic laminate constituted by at least two layers of sheet material of substantially differing characteristics and the layers facing one another will be designated hereafter as the "interior layers" while the layers facing away from one another will be designated hereafter as the "exterior layers." Thus, the front wall bottom portion 11 consists of an interior layer 17 and an exterior layer 18 while the front wall top portion 12 and the rear wall 13, being produced intergrally, consist of interior layers 19 and exterior layers 20.

In accordance with the present invention, the interior layers 17 and 19 are produced from a thermoplastic material which readily heat seals to itself while the exterior layers 18 and 20 a produced from a thermoplastic material which adheres relatively poorly to the interior layers 17 and 19. In particular, when the interior layers are heat sealed to each other, the seal created is of far greater strength than the adherence strength between the juxtaposed interior and exterior layers.

Various combinations of materials will satisfy this requirement and, as exemplary thereof, the interior layers 17 and 19 may be polyethylene while the exterior layer may be polypropylene. Highly satisfactory results have been obtained where the interior layers were produced from a low-density polyethylene and the exterior layers were produced from Surlyn A (an ionomer resin which is an ionic crosslinked ethylene-acrylic copolymer containing metallic ions from Groups 1 or 2 of the periodic table and is available commercially as duPont A1601 Resin) which has a rated density of 940. This material has good stress, crack and abrasion resistance which are highly desirable characteristics in the packaging of articles to be sterilized. Other highly satisfactory combinations of materials for present purposes include an exterior layer of either Surlyn or polyethylene where the interior layer is ethylene vinyl acetate. In either of these combinations, the exterior layer will delaminate while the facing polyethylene or ethylene vinyl acetate layers have an adherence strength which insures against delamination.

A specific combination of Surlyn A and polyethylene which is suitable for the pouch of the present invention is the laminated film known as MULTIFILM-20, a product of the U.S. I. Film Products Division of National Distillers and Chemical Corporation. This material has a nominal gauge thickness of about 4 mils wherein the Surlyn A layer has a thickness on the order of 1 – 1.5 mils and the polyethylene layer has a thickness on the order of 2 – 2.5 mils. This material may be extruded in a laminating die and has a seal strength on the order of 250 grams/square centimeter, with the bond strength between the polyethylene layer and the Surlyn A layer being somewhat less than the seal strength of the heat seal between the opposed interior polyethylene layers. Thus, the lamination will fail before the seal when the two pouch panels are pulled apart in order to obtain the peel-opening characteristics of the present invention.

As stated hereabove, particularly suitable laminated materials for present purposes have been found to be coextrusions where the interior layer was constituted by ethylene vinyl acetate and the exterior layer was either Surlyn or polyethylene.

Figure 2:
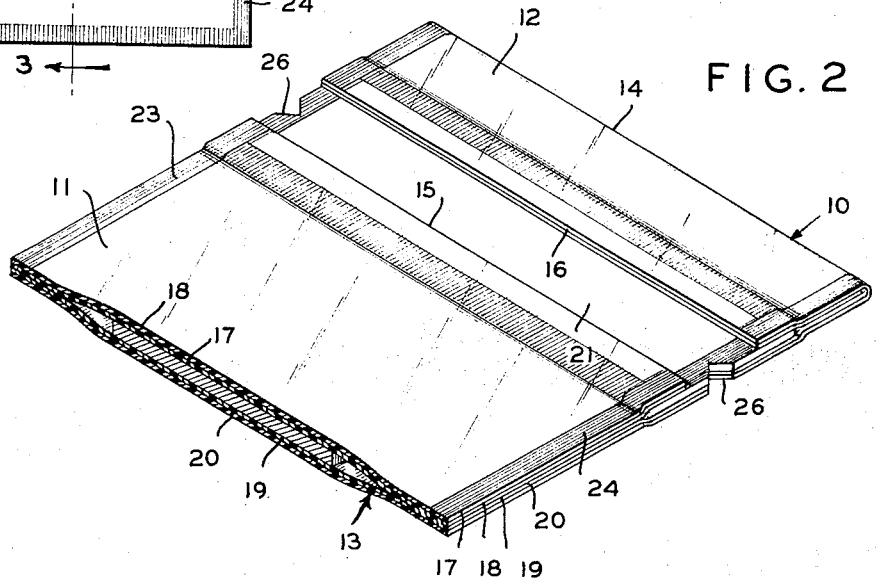
FIG. 2 is a fragmentary perspective view, on an enlarged scale, of the novel pouch of FIG. 1, a portion thereof being broken away to disclose the bag contents.
Figure 3:
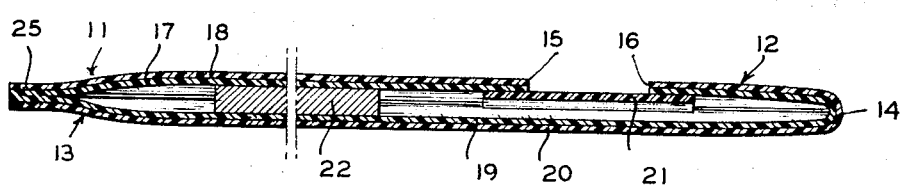
FIG. 3 is a vertical sectional view of the pouch, taken on the line 3—3 of FIG. 1 and looking in the direction of the arrows.

In the production of the novel pouch of the present invention two strips of laminated film are placed in spaced and parallel side-by-side relationship. One of these strips constitutes the front wall bottom portion 11 while the other strip (of substantially greater width) constitutes the combined front wall top portion 12 and rear wall 13 prior to the creation of the fold line 14. With the edges 15 and 16 of the bottom and top portions of the front wall of the pouch spaced apart a suitable distance (as shown in FIGS. 2 and 3 of the drawings) a strip or panel 21 produced from a spun-bonded polyolefin is sealed to the edge portions 15 and 16 thereby closing the gap therebetween and completing the front wall of the prospective pouch. A particularly suitable spun-bonded olefin for present purposes is produced by duPont and is identified commercially as TYVEK, this material having porous characteristics so as to be permeable to sterilizing gases, such as ethylene oxide, but impermeable to bacteria.

When the TYVEK panel has been sealed to the spaced strips or lengths of laminated film, the next step in the production of the novel pouch of the present invention is the creation of the fold line 14 in the pouch rear wall with the free bottom edges of the two film strips disposed in longitudinal alignment and with the pouch contents positioned therebetween. This could be an item of widely varying characteristics including a needle, suture, sponge, or other comparable article (having surgical or related utility) and has been illustrated diagramatically at 22. As shown clearly in FIG. 3 of the drawings, the TYVEK strip 21 is located interiorly of the sealed pouch and provides a window spanning the space between the edges 16 and 15 of the spaced top and bottom portions of the front wall of the pouch.

The pouch is then heat sealed along the side edges 23 and 24 and the bottom edge 25. These seals may be accomplished simultaneously with the detachment or severance of the finished pouch from a continuous length of laminated film folded as set forth hereabove.

Either simultaneously with the pouch sealing operation, or as a subsequent manufacturing step, the sealed pouch side edges or areas 23 and 24 are weakened as indicated by the opposed notches 26 which are located in horizontal alignment within the sealed edge portions of the TYVEK panel 21. Opening of the pouch, as will be discussed hereafter, is accomplished by tearing across, through the pouch rear wall 13 and TYVEK panel 21, from notch to notch. The invention also contemplates that the opposed notches or weakened portions 26 may be located either above or below the TYVEK panel, dependent upon the size and location of the package contents, and the bag then is opened or torn, from edge to edge, along the plane of the opposed notches.

When using the pouch, the article to be contained therein is placed between the front and rear panels, the panels are heat sealed along the side and bottom edges, and the side edges preferably are notched or otherwise weakened all as shown more particularly in FIG. 1 of the drawings. The sealed pouch is then placed in a sterilization chamber which is first evacuated and then flushed with ethylene oxide. During the evacuation process the seal and lamination strengths between the layers, or laminates, is sufficient to prevent bursting of the pouch. Afte the flushing with ethylene oxide for a predetermined cycle, the pouch contents will be sterilized and the packaged article, when removed from the sterilization chamber, is ready for use.

To obtain access to the sterile pouch contents, the pouch is torn across from notch to notch through the rear wall 13 and the TYVEK panel 21, the initiation of this tear being illustrated at 27 in FIG. 5 of the drawings. Then, by grasping the upper edge of the rear wall of the pouch in one hand and the remaining portion of the TYVEK panel in the other hand, the pouch may be peeled open readily, as illustrated in FIG. 6 of the drawings, to expose the pouch contents which may be removed without possibility of contamination as by contact or engagement with the torn edges of the pouch.

There are several possible ways in which the pouch may peel, and these have been illustrated in FIGS. 7, 8, and 9 of the drawings. Bearing in mind that the edge seals 28 between the two interior layers 17 and 19 are of sufficiently great strength that separation cannot occur under the stresses applied, the exterior layer 18 of the bottom portion 11 of the front wall will delaminate and the interior layer 17 will tear along the inner edges 23a and 24a of the side seals 23 and 24. This is shown clearly in FIG. 7 of the drawings.

Alternately, the exterior layer 20 of the rear wall 13 will delaminate and the interior layer 19 of the rear wall will tear along the inner edges 23b and 24b of the side seals 23 and 24. This is illustrated with greater particularity in FIG. 8 of the drawings.

Peeling, or separation, also may take place in the manner illustrated in FIG. 9 of the drawings where delamination along the inner edges of the side seals 23 and 24 occurs in an opposite manner with the tear 23a as to the interior layer 17 of the pouch front wall 11 and the tear 24b as to the interior layer 19 of the pouch rear wall, or reversely.

The invention also contemplates that the transverse seal between the front wall bottom portion 11 and the TYVEK panel 21 will not extend to the edge 15 of the front wall bottom portion. With this embodiment, or modification, of the invention, it is only required that the free edge 15 of the front wall bottom portion be grasped and pulled downwardly. This will result in the separation or tearing from the pouch of the entire central part of the front wall bottom portion, between the opposed side seals 23 and 24, thereby exposing the pouch contents in sterile condition and ready for removal.

There has thus been described a novel, breathable, sterilizable and peelable pouch for the secure packaging of sterile articles, and a method for the manufacture thereof, which may be produced readily and with particular economy and which may be utilized with convenience in commercial packaging operations where, within reasonable limits, the specific contour of the item being packaged has no bearing on either continuous or intermittent operations or the handling of the pouch or contents. It will be understood that various changes may be made in the invention without departing from the spirit and scope thereof, and reference therefore is had to the claims for summaries of the essentials of the invention, as well as the novel features of construction and novel combinations of parts and materials, for all of which protection is desired.

What is claim is:

1. A peel-open, ethylene-oxide permeable pouch for sterilized articles, said pouch having a front wall and a rear wall, said front and rear walls being heat-sealed to each other along the side and bottom edges thereof; said front wall comprising spaced top and bottom portions, the top portion being formed integrally with said rear wall; a porous polyolefin panel, which is permeable to sterilizing gases and impermeable to bacteria, heat-sealed to the interior surfaces of the spaced edges of said top and bottom front wall portions and spanning the space therebetween; said pouch front and rear walls consisting of laminated interior and exterior layers of diverse thermoplastic materials, the facing interior layers being characterized by the ability to create a heat-seal therebetween having an adhesion strength greater than the strength of the lamination between said interior and exterior layers, whereby said pouch can be peeled open with the layers thereof delaminating along at least the interior edges of the side heat seals.

2. The peel-open pouch of claim 1 wherein the interior layers of said front and rear walls are produced from low density polyethylene.

3. The peel-open pouch of claim 1 wherein the interior layers of said front and rear walls are produced from ethylene vinyl acetate.

4. The peel-open pouch of claim 1 wherein the interior layers of said front and rear walls are produced from ethylene vinyl acetate and the exterior layers thereof are produced from low density polyethylene.

5. The peel-open pouch of claim 1 wherein the interior layers of said front and rear walls are produced from ethylene vinyl acetate and the exterior layers thereof are produced from Surlyn.

6. The peel-open pouch of claim 1 wherein the interior layers of said front and rear walls are produced from low density polyethylene and the exterior layers thereof are produced from Surlyn.

7. The peel-open pouch of claim 1 wherein the interior layers of said front and rear walls are produced from low density polyethylene and the exterior layers thereof are produced from ethylene vinyl acetate.

8. The peel-open pouch of claim 1 wherein the exterior edge of each pouch side seal is notched to provide a weakened tear point, the opposed notches being located in the same transverse plane and within the confines of the porous panel.

* * * * *